United States Patent Office 3,357,997
Patented Dec. 12, 1967

3,357,997
PREPARATION OF 4-OXO-2,4,5,6,7,7a-HEXAHYDROBENZOTHIOPHENES
Harold M. Foster, Middlesex, and Roger P. Napier, Edison, N.J., assignors to Mobil Oil Corporation, a corporation of New York
No Drawing. Filed Dec. 20, 1965, Ser. No. 515,221
3 Claims. (Cl. 260—332.3)

ABSTRACT OF THE DISCLOSURE 4-oxo-2,4,5,6,7,7a-hexahydrobenzothiophene and substituted derivatives are prepared in a two step reaction. In the first step the ethylene ketals of 3-mercaptocyclohexanone is reacted with haloacetaldehyde, in the presence of an acid acceptor such as a base or tertiary amine, to produce an intermediate. In the second step the intermediate is reacted in the presence of a protic acid catalyst to produce the subject compound.

---

This invention is directed to the two-step preparation of 4-oxo-2,4,5,6,7,7a-hexahydrobenzothiophene and ring-substituted derivatives thereof.

The compounds produced by the process of this invention are useful intermediates for the preparation of 4-hydroxybenzothiophenes. The 4-hydroxybenzothiophenes are converted into benzothienyl carbamates by reaction with phosgene to form the chloroformate, followed by reaction with a primary or secondary amine or by reaction with an isocyanate. They are an effective class of pesticides, which control a variety of pests including Root Knot Nematode, Two-Spotted Spider Mite, Mexican Bean Beetle, Southern Armyworm, Pea Aphid, and House Fly, as fully disclosed in copending application Ser. No. 487,333 filed Sept. 14, 1965, now U.S. Patent No. 3,288,673, a continuation-in-part of application Ser. No. 427,089, filed Jan. 21, 1965, now U.S. Patent No. 3,288,808, a continuation-in-part of application Ser. No. 334,581, filed Dec. 30, 1963, now abandoned, a continuation-in-part of application Ser. No. 220,073, filed Aug. 28, 1962 now abandoned.

The compounds produced in the process of this invention are converted into 4-hydroxybenzothiophenes by liquid or vapor phase dehydrogenation. Typical procedues for effecting such dehydrogenation are described in copending applications Ser. No. 455,604, filed May 13, 1965; Ser. No. 458,771, filed May 25, 1965; now U.S. Patent No. 3,317,552 and Ser. No. 468,094, filed June 29, 1965.

Accordingly, it is a broad object of this invention to provide a process for preparing intermediates for the preparation of an effective class of pesticides. Another object is to provide a process for preparing intermediates for the preparation of benzothienyl carbamates. A specific object is to provide a process for preparing 4-oxo-2,4,5,6,7,7a-hexahydrobenzothiophene and ring-substituted derivatives thereof. Other objects and advantages of this invention will become apparent to those skilled in the art, from the following detailed description.

This invention provides a two step process for producing 4 - oxo - 2,4,5,6,7,7a - hexahydrobenzothiophenes that comprises first reacting a cyclohexanone compound having the formula:

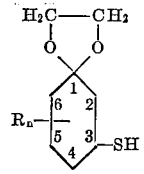

wherein $n$ is 0 to 3, R is selected from the group consisting of alkyl ($C_1$–$C_8$), alkenyl ($C_2$–$C_8$), alkoxy ($C_1$–$C_4$), alkylthio ($C_1$–$C_4$), di($C_1$–$C_4$)alkylamino, and cyano, with a haloacetaldehyde in the presence of an acid acceptor to form an intermediate product, and then subjecting said intermediate to hydrolysis and ring closure in the presence of an acid catalyst.

One reactant used in the first step of the process of this invention is an ethylene ketal of 3-mercaptocyclohexanone which can contain ring substituents, as indicated in the structural formula set forth hereinbefore. Non-limiting examples of this reactant are the ethylene ketals of 3-mercaptocyclohexanone; of 3-mercapto-4-octylcyclohexanone; of 3-mercapto-5-butenylcyclohexanone; of 3-mercapto-6-propoxycyclohexanone; of 3-mercapto-4-diethylaminocyclohexanone; of 3-mercapto-5-hexenylcyclohexanone; of 3-mercapto-4-vinylcyclohexanone; of 3-mercapto-5-cyanocyclohexanone; and of 3-mercapto-4-ethylmercaptocyclohexanone.

The other reactant is a haloacetaldehyde reactant, i.e. chloroacetaldehyde, bromoacetaldehyde, or iodoacetaldehyde. Within the term "haloacetaldehyde reactant" it is contemplated to use the trimers, tetramers, and higher polymers of these haloacetaldehydes. Accordingly, it is contemplated to use haloacetaldehydes having the structures:

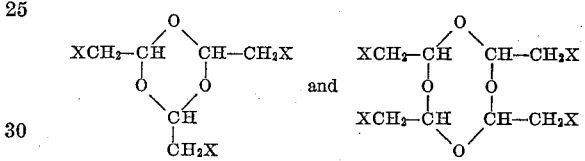

wherein X is Cl, Br or I.

The reaction between the ethylene ketal of 3-mercaptocyclohexanone reactant hand the haloacetaldehyde reactant is carried out in the presence of an acid acceptor, i.e., a compound that is commonly used to react with hydrogen halide to remove it from a reaction. Suitable acid acceptors are alkali metal and alkaline earth metal oxides, hydroxides, carbonates and bicarbonates. Also utilizable are tertiary amines, such as tri-lower ($C_1$–$C_4$) alkylamines, pyridine, N,N-dialkylanilines, as well as basic resins, etc.

The first step reaction to form the intermediate in the process of this invention can be carried out at temperatures ranging from room temperature up to about 90° C. Preferably, a suitable solvent is used such as ethanol, propanol, and benzene, although solvents suitable for the second step, e.g., toluene or xylene, can be used.

The second step reaction (hydrolysis and ring closure of the intermediate from the first step) involved in the process of this invention can be carried out at atmospheric pressures at temperatures of between about 70° C. and about 100° C. It is preferred, however, to operate at the more elevated temperatures and a temperature of about 90–100° C. has been found feasible. If a pressure vessel is used, temperatures up to about 120° C. can be employed, in order to speed up the reaction. Temperatures higher than 120° C. should be avoided, however, because the reaction products show some thermal instability.

The catalyst for this second step is a protic acid, i.e., an organic acid, such as p-toluenesulfonic acid, or a mineral acid. Hydrochloric acid appears to be a preferred catalyst, but other mineral acids, such as phosphoric and sulfuric acids can be used, as well as acidic clays, sulfonated resins, etc.

The second step reaction proceeds rapidly, smoothly, and in good yield when an inert solvent, such as toluene or xylene, is used to moderate the reaction. The amount of solvent used will generally be between about 2 volumes and about 10 volumes per volume of starting material. Other aromatic, acyclic, and alicyclic hydrocarbons can be employed, but one should be chosen that will form an azeotrope with water at the temperatures set forth thereinbefore, preferably at 90–100° C.

The following examples demonstrate the process of this invention. It must be strictly understood, however, that this invention is not to be limited to the specific reactants and conditions employed, or to the operations and manipulations involved. Other reactants and conditions can be used, as is described hereinbefore.

*Example 1*

One gram of 3-mercaptocyclohexanone, ethylene ketal, was dissolved in 5 ml. of benzene and the solution added dropwise to a slurry of 0.144 g. sodium hydride in 3 ml. of benzene during good stirring. The green slurry which formed was stirred for an additional 15 minutes. A solution of 1 g. of anhydrous chloroacetaldehyde in 10 ml. of benzene was added to the slurry over a 0.5-hr. period during good stirring. An exotherm and color change from green to brown was noted. Vapor Phase Chromatographic examination of the resulting solution on a 2 ft., XE–60 column (other parameters described below) indicated a component having "V.P.C. retention time" of 13.6 minutes, identified as the condensation-product intermediate. The solution was clarified and the benzene removed by evaporation. The residue was dissolved in 20 ml. of xylene and further treated with 5 ml. of 10% aqueous hydrochloric acid. The mixture was heated under reflux for 1.5 hours. V.P.C. examination at this time indicated that the 13.6-minute "V.P.C. retention time," component was disappearing and that a new component, "V.P.C. retention time," 11 mins. was appearing. This latter retention time corresponds to 4-oxo-2,4,5,6,7,7a-hexahydrobenzothiophene.

The following description of conditions and parameters will serve to form the basis for a description of the physical property "V.P.C. retention time."

Instrument _____ Model #720, F&M Scientific Corp., Avondale, Pa.
Column size _____ ¼" O.D. x 2', stainless steel.
Column packing _____ 10% silicone gum nitrile, General Electric XE–60, on Diatoport W acid washed, purchased from F&M Scientific Corp.
Carrier Gas: Helium ___ Helium outlet flow: 60 mls. per min. @ 40 p.s.i.g.
Injection port temp. ____ 300° C.
Detector block temp. ___ 345° C.
Chart speed _____ One-half inch per minute.
Detector current _____ 100 ma.
Column conditions _____ 100° C. at injection; then program at 10° C. per minute to 250° C. and hold as long as required.

*Example 2*

One gram of 3-mercaptocyclohexanone, ethylene ketal, was dissolved in 10 ml. of dry ethanol. Sodium hydroxide (0.25 g.) was added followed by 1 g. of anhydrous chloroacetaldehyde dissolved in 20 ml. of dry ethanol. Sodium chloride was precipitated; the color changed from brown to red-brown.

V.P.C. examination (see above) of the reaction mixture showed a component having "V.P.C. retention time," 13.6 minutes, corresponding to the condensation-product intermediate of Example 1.

*Example 3*

A solution of 0.52 g. of 3-mercaptocyclohexanone, ethylene ketal, and 0.12 g. of sodium hydroxide in 10 ml. of n-propanol was heated to a boil during stirring. To this was added 0.69 g. of chloroacetaldehyde trimer-polymer. Heating at reflux was continued for 16 hrs. The reaction mixture was poured into water and extracted with xylene. The xylene extract was further treated with 10% aqueous hydrochloric acid and the mixture heated at reflux for 1 hour. V.P.C. examination at this time (see above) indicated that 4-oxo-2,4,5,6,7,7a-hexahydrobenzothiophene has been formed.

Although the present invention has been described with preferred embodiments, it is to be understood that modifications and variations may be resorted to, without departing from the spirit and scope of this invention, as those skilled in the art readily understand. Such variations and modifications are considered to be within the purview and scope of the appended claims.

What is claimed is:

1. A two step process for producing 4-oxo-2,4,5,6,7,7a-hexahydrobenzothiophenes that comprises first reacting a cyclohexanone compound having the formula:

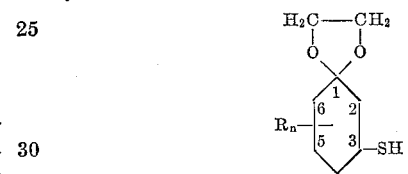

wherein $n$ is 0 to 3 and R is selected from the group consisting of alkyl ($C_1$–$C_8$) and alkenyl ($C_2$–$C_8$), with a haloacetaldehyde selected from the group consisting of chloroacetaldehyde and chloroacetaldehyde trimer, in the presence of an acid acceptor to form an intermediate product and then subjecting said intermediate product to hydrolysis and ring closure in the presence of a protic acid catalyst said R occupying any 4–6 position on the ring.

2. The process defined in claim 1, wherein said cyclohexanone compound is the ethylene ketal of 3-mercaptocyclohexanone, said haloacetaldehyde is chloroacetaldehyde, said acid acceptor is sodium hydride, and said acid catalyst is hydrochloric acid.

3. The process defined in claim 1, wherein said cyclohexanone compound is the ethylene ketal of 3-mercaptocyclohexanone, said haloacetaldehyde is chloroacetaldehyde trimer, said acid acceptor is sodium hydroxide, and said acid catalyst is hydrochloric acid.

References Cited

UNITED STATES PATENTS 3,070,606   12/1962   Anderson _____ 260—330.5
3,084,168   3/1963   Hearne _____ 260—340

OTHER REFERENCES

Fieser et al.: Advanced Organic Chemistry (1961), pages 441 to 443 relied on.
Morrison et al.: Organic Chemistry (1959), pages 636 to 640 relied on.
Pailer et al.: Monatshefte Für Chemie 91:1070 (1960).
Tilichenko et al.: Chemical Abstracts (1962).

WALTER A. MODANCE, *Primary Examiner.*

C. M. SHURKO, *Assistant Examiner.*

UNITED STATES PATENT OFFICE
CERTIFICATE OF CORRECTION

Patent No. 3,357,997                      December 12, 1967

Harold M. Foster et al.

It is hereby certified that error appears in the above numbered patent requiring correction and that the said Letters Patent should read as corrected below.

Column 2, line 35, for "hand" read -- and --; column 4, lines 25 to 31, the formula should appear as shown below instead of as in the patent:

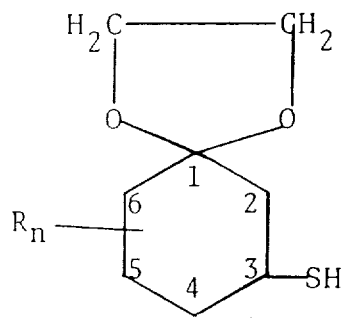

Signed and sealed this 14th day of January 1969.

(SEAL)
Attest:

EDWARD M. FLETCHER, JR.                     EDWARD J. BRENNER
Attesting Officer                            Commissioner of Patents